UNITED STATES PATENT OFFICE.

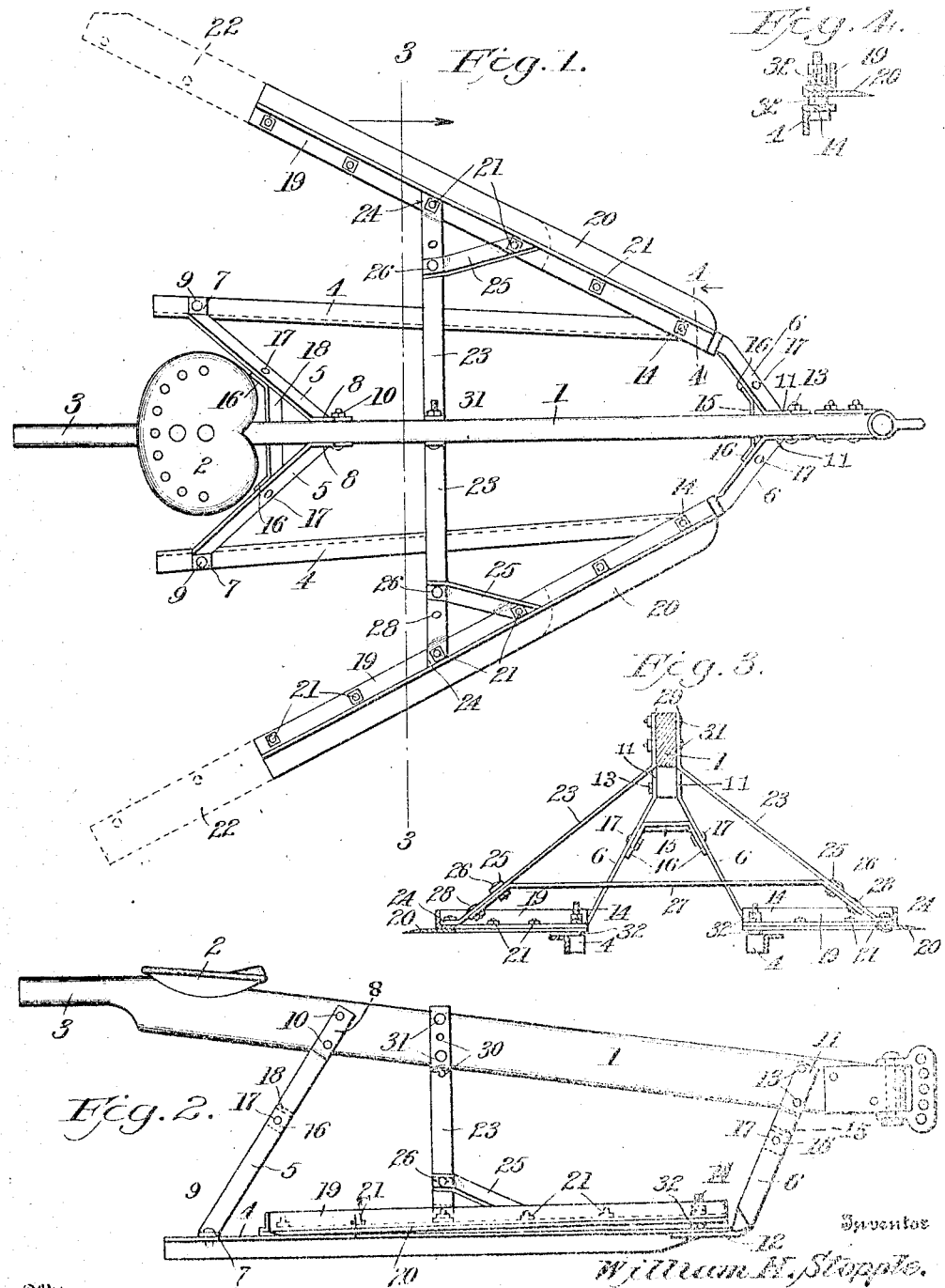

WILLIAM H. STOPPLE, OF DALLAS, TEXAS.

STALK-CUTTER.

No. 893,825.

Specification of Letters Patent.

Patented July 7, 1908.

Application filed September 10, 1907. Serial No. 392,135.

*To all whom it may concern:*

Be it known that I, WILLIAM H. STOPPLE, a citizen of the United States, residing at Dallas, in the county of Dallas and State of Texas, have invented certain new and useful Improvements in Stalk-Cutters, of which the following is a specification, reference being had therein to the accompanying drawing.

This invention relates to improvements in stalk cutters, and has for its object the provision of means for facilitating the cutting of stalks in rows.

Another object of the invention is the provision of means for facilitating the adjustment of the blade or blades of a stalk cutter, and, furthermore, the peculiar construction of a sled-frame which will prevent the machine or cutter from being moved from the desired position between the rows, even though the growth on one side of the machine is thinner or heavier than that on the opposite side.

With these and other objects in view, the invention consists of certain novel constructions, combinations, and arrangements of parts, as will be hereinafter fully described and claimed.

In the drawings: Figure 1 is a top plan view of a cutter or machine constructed in accordance with the present invention. Fig. 2 is a view in side elevation of the structure depicted in Fig. 1. Fig. 3 is a transverse, sectional view taken on line 3, 3, Fig. 1 and looking in the direction of the arrow.
Fig. 4 is a transverse, sectional view taken on line 4, 4, Fig. 1 and looking in the direction of the arrow.

Referring to the drawings by numerals, 1 is a draft beam constituting a part of the sled-frame. The draft beam is provided at its front end with suitable means, whereby a draft animal may be attached thereto. A seat 2 is secured to the upper portion of the draft beam near its rear end. A handle 3 is formed upon the rear end of the draft beam, whereby the operator may grasp said beam for lifting or manually-adjusting the cutter or machine. Runners 4, preferably formed of angle-iron, are fixedly secured near their rear ends to draft-beam 1 by means of rear-inclined, diverging standards 5, 5, while their front ends are fixedly secured to the draft beam by front, inclined standards 6, 6.

Each of the rear standards 5 is provided with a horizontal extension 7 near its lower end and with a vertical extension 8 at its upper end. Any suitable fastening means, as for instance, a rivet or bolt 9, is passed through the horizontal extension 7 and the horizontal portion of the angle-iron runner 4, while the parallel portions 8 of said standards 5, are secured against the sides of the beam by any suitable transverse fastening means 10 extending through said portions 8 and beam 1. Each of the front standards 6 is provided with a substantially vertical portion 11 and with a horizontal portion 12 (Fig. 2). Suitable fastening means, as for instance, bolts or rivets 13, secure the vertical portions 11 of the front standards 6 against the sides of the beam 1. The horizontal portions 12 of the front standards are secured parallel with the front portions of the runners by means of detachable bolts 14.

The front standards 6 are strengthened by a horizontal brace 15, which brace is provided at its ends with angularly-disposed portions 16, the angularly-disposed portions 16 being fixedly secured to the standard 6 by any suitable fastening means, as for instance, rivets 17. The rear standards 5 are also strengthened by a horizontal brace 18, similar in construction to the brace 15. The rear brace 18 is provided with angularly-disposed portions 16, and these portions are secured against the standards 5 by any suitable fastening means, as for instance, rivets 17. The rear brace 18 constitutes a foot-rest. It will be noted that the seat 2 is so located that the operator's feet can be easily placed upon the foot-rest 18.

The sled-frame comprises the beam 1, runners 4, 4, standards 5 and 6, and the braces 15 and 18. As all of this frame, with the exception of beam 1, is, preferably, formed of metal, the same produces a very durable structure. The runners 4 slightly diverge from their front ends towards their rear ends forming a small wedge-like path, which tends to prevent the frame from having any lateral movement, as it passes between the rows. Of course, it will be obvious that when the operator is seated upon the frame, his weight will act as a ballast for holding the frame in position. The vertical portions of the angle-iron runners 4 cut into the ground and also assist in preventing the frame from swinging or skewing to one side. Therefore, it will be noted that there are two mechanical features of my sled-frame, which hold the frame against a sliding or lateral displacement, to wit: the flanged or vertically-disposed portions of the runners and the angular positioning of the runners with respect to each other.

The cutter bars 19 are, preferably, formed of angle-iron, and blades 20 are detachably secured to these cutter bars. The blades 20 and cutter bars 19 are adjustably secured to the sled-frame, as hereinafter specifically described. The horizontal portion of the cutter bars is provided, preferably, with a series of apertures, and the blades 20 are also provided with a similar number of apertures which register, when the blades and cutter bars are assembled. Suitable fastening means 21, as for instance, bolts, are positioned within the registering apertures of the blades and bars, and then ordinary nuts are threaded upon the ends of the bolts for securing the bars and blades together. If it is desired, the blades 20 can be adjusted longitudinally of the cutter bars by removing the bolts and moving the blades rearwardly, as shown by dotted lines 22, Fig. 1, and then inserting bolts 20 in the registering apertures of the blades and bars. By means of this adjustment, stalks grown in rows spaced apart a great distance, can be cut, whereas under normal conditions, the machine can cut stalks grown in rows very close together. The cutter bars strengthen the blades. Even in extreme cases, when the rows of stalks are a great distance apart, it will only be necessary to adjust a portion of the blades a comparatively short distance beyond the rear ends of the cutter bars, and the blades are of sufficient strength to resist any strain placed thereon in cutting the stalks, even though the angle-iron cutter bars do not extend the entire length of the blades when so adjusted. The vertical portion of the cutter-bars constitutes a rib for reinforcing the horizontal portion thereof. The blades, through the medium of the cutter-bars, are adjustably secured to the beam 1 and the runners 4.

The means for adjustably securing the blades and cutter-bars to the beam 1 comprises inclined braces 23, which are provided at their lower ends with horizontal portions 24 resting upon the horizontal portion of the cutter-bars. Each horizontal portion is provided with an aperture which registers with an aperture of one of the cutter-bars and one of the blades. A bolt 21 is positioned within the aperture of the horizontal portion 24, and thereby secures the inclined brace 23 to said bar and blade. An auxiliary brace 25 is employed in the construction of my machine, and this brace 25 is connected, near its upper end, by any suitable fastening means, as for instance, rivet 26, to an inclined, primary brace 23, and the lower end of each of the braces 25 is connected to a cutter bar by means of a bolt 21. It will be noted that these braces 25 greatly strengthen the cutter bars and blades, as they constitute a double connection between each brace 23 and its respective cutter bar and blade. The horizontal brace 27 is connected near its ends to the inclined braces 23 by means of rivet 26 and rivets or bolts 28. The upper end 29 of each of the inclined braces 23 is, preferably, formed in a vertical plane, so that the same may rest snugly against the vertical side of beam 1. Each of the upper ends or angularly-disposed portions 29 of the braces 23 is provided with, preferably, a series of apertures 30, whereby suitable fastening means, as for instance, bolts 31, may be passed through the apertures 30 of the braces 23 and registering apertures of beam 1, and secure the braces 23 in an adjusted position. It will be obvious that by removing the bolts 31, the braces 23 can be adjusted vertically upon the sides of the beam 1, and, subsequently, the bolts can be inserted into the registering apertures for retaining said braces in their adjusted position. The vertical adjustment of the braces 23 will, consequently, raise or lower the blades 20, so that said blades can be adjusted to accommodate the different conditions under which the machine may be required to work. For instance, if the stalks are grown in ridges, it will be necessary to adjust the blades to a higher position than if the stalks were in level ground.

The bolts 14 perform the same function with respect to securing the blades and cutter bars together, as the bolts 21, only I, preferably, form bolts 14 longer than bolts 21, for the reason that the adjustment of the front ends of the blades and cutter bars is obtained through the medium of these bolts 14, and, preferably, washers 32. If the blades are to be raised, a suitable number of washers 32 may be placed upon the bolts 14 between the blades and the runners 4, after which nuts may be threaded upon the bolts for securing the runners and blades together. By removing a washer or washers, the blades may be lowered.

If it is desired to lower the blades and retain the washers upon the machine, this may be accomplished by removing the washers, lowering the blade, and then, subsequently, placing the washers on the bolts 14 above the cutter bars (Fig. 4) and then threading the nuts upon said bolts.

It will be obvious that I have provided means for vertically adjusting the front ends of the blades upon the runners of the sled-frame, besides I have provided means for adjusting the blades intermediate or near their rear ends upon the sled-frame.

I have found from practical experience that, by reason of the peculiar positioning of the angle-iron runners, with respect to each other, which constitutes a spreading of the same at the rear of said frame, with the operator's weight for a ballast, the machine or cutter will set itself perfectly steady in its line of draft and show no inclination to get out of its course when cutting in irregular growths, as for instance a heavy bunch of stalks on one side and a gap or light growth on the other.

The blades 20 are, preferably, beveled upon their upper faces for forming a cutting edge, and by reason of this beveling, the operator can easily file the blades and keep the same sharp. The V-shaped positioning of the cutter bars makes it unnecessary, under normal conditions, to adjust said bars with respect to the sled-frame, although, to accommodate the machine to different growths or widths of rows, the blades may be adjusted upon the cutter bars, as hereinbefore described.

What I claim is:

1. A stalk cutter, comprising a sled-frame provided with runners positioned at an angle to each other, a blade contiguous to said sled-frame, and means adjustably securing said blade to said sled-frame.

2. A stalk cutter, comprising a sled-frame provided with a beam and a runner, a blade, means detachably securing said blade to the runner near its front end, and means detachably securing said blade intermediate its ends to the beam.

3. A stalk cutter comprising a sled-frame, said frame provided with a pair of angle-iron runners, each runner disposed at an angle to the other runner, a beam, standards connecting said beam to said runners, a blade, and means connecting said blade to said sled-frame.

4. A stalk cutter, comprising a sled-frame provided with a runner and a beam, a blade, means securing the blade near its front end to the runner, and means securing the blade to said beam.

5. A stalk cutter, comprising a sled-frame, said sled-frame comprising runners, a beam, standards connecting said runners near their front and rear ends to said beam intermediate its ends, blades positioned upon opposite sides of said beam and contiguous to said runners, means connecting said blades to said runners, and means connecting the blades intermediate their ends to said beam.

6. A stalk cutter, comprising a frame provided with a beam, a blade connected near its front end to said frame, a brace connected at one end to said beam, means connecting the opposite end of said brace to said blade intermediate its ends, an auxiliary brace connected at one end to said first-mentioned brace, and means connecting the opposite end of said auxiliary brace to said blade.

7. A stalk cutter, comprising a sled-frame provided with runners and a beam, standards connected at their upper ends to said beams and at their lower ends to said runners, a horizontal brace secured between and at its ends to said standards, said brace constituting a foot-rest, and blades secured to said sled-frame.

8. A stalk cutter, comprising a sled-frame provided with a pair of runners and a beam, inclined standards connecting said beam to said runners near their rear end, a seat secured to said beam contiguous to said standards, a brace connecting said standards between their ends, said brace constituting a foot-rest, and blades secured to said sled-frame.

9. A stalk cutter provided with a beam and a runner, a blade, a bolt extending through said runner and blade, a washer carried by said bolt and interposed between said blade and runner, a nut threaded upon said bolt, and means connecting said blade intermediate its ends to said beam.

10. A stalk cutter, comprising a frame, a blade positioned contiguous to said frame, a detachable member interposed between said blade and frame, a bolt extending through said frame, detachable member, and blade, and means for securing said bolt upon said runner, detachable member, and blade.

11. A stalk cutter, comprising a frame, a blade positioned contiguous to said frame, spacing means interposed between said frame and blade, and means for securing said blade, spacing means, and frame together.

12. A stalk cutter, comprising a frame provided with a beam, a blade, means securing said blade near its front end to said frame, a brace provided with a plurality of apertures near one end, means extending through one of said apertures and detachably securing said brace to said beam, and means securing the opposite end of said brace to said blade.

13. A stalk cutter, comprising a frame, a cutter bar, means securing said cutter bar to said frame, a detachable blade engaging said cutter bar, and detachable means securing said blade to said cutter bar, whereby said blade may be adjusted longitudinally thereof.

14. A stalk cutter, comprising a frame provided with angularly-disposed runners and with inclined standards, braces connecting said standards intermediate their ends, and blades secured to said frame.

15. A stalk cutter, comprising a frame provided with a horizontal blade, and means for bodily, vertically adjusting the blade and securing the same in different horizontal planes.

In testimony whereof I hereunto affix my signature in presence of two witnesses.

WILLIAM H. STOPPLE.

Witnesses:
M. L. ROBERTSON,
WM. D. SIMPSON.